Feb. 3, 1970

JAMES E. WEBB
ADMINISTRATOR OF THE NATIONAL AERONAUTICS
AND SPACE ADMINISTRATION
FLUID FLOW RESTRICTOR 3,493,012

Filed Sept. 15, 1967

INVENTOR.
GILBERT J. BASTIEN
BY D E Leslie
G H McCoy
ATTORNEYS.

INVENTOR.
GILBERT J. BASTIEN

United States Patent Office 3,493,012
Patented Feb. 3, 1970

3,493,012
FLUID FLOW RESTRICTOR
James E. Webb, Administrator of the National Aeronautics and Space Administration, with respect to an invention of Gilbert J. Bastien, Altadena, Calif.
Filed Sept. 15, 1967, Ser. No. 668,238
Int. Cl. F25b *41/06;* F15c *4/00*
U.S. Cl. 138—42                                    7 Claims

ABSTRACT OF THE DISCLOSURE

A length of capillary tubing of known all viscous flow resistance is wound helically onto a spool with each end of the tubing extending into an aperture through the opposite end flanges of the spool. A standard coupling is connected at each end of the spool in alignment with the ends of the capillary tubing for connection of the device into a gas line to provide a known resistance to flow. The capillary tubing is encased in a thermal insulating resin. In one embodiment, a plurarility of lengths of the capillary tubing of different flow resistances are wound on the same spool and have their ends extending through the flanges at arcuately spaced points. The spool is rotatable relative to an inlet and outlet to register any selected length of capillary tubing with the inlet and outlet.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to a device for restricting the flow of fluid, and more particularly, to a tubular flow restrictor adapted to be inserted into a gas conduit to control the flow rate.

Often it is desirable to reduce or accurately regulate the rate of flow of fluid in a tube. By way of example, accurate measurements with certain instruments such as a gas chromatograph sometimes require very low rates of flow, necessitating regulation of the flow rate through a line into the instrument. There are several known methods or devices for providing very high resistance to gas flow including sonic orifices or blocks of porous material. Both of these devices, however, rely on the flow of gas through extremely small holes which are easily plugged by debris or by impurities in the gas. Even moisture contained in the gas may clog the porous material and thus change the supposedly known rate of flow. Furthermore, neither device has been entirely satisfactory because they do not lend themselves to accurate mathematical prediction of the flow rate through the device.

Thus, there is a need for a fluid flow restrictor which is not subject to plugging under normal use, and which can be relied on to provide an accurate predetermined resistance to the flow of fluid. Freedom from clogging is particularly important when the device is inaccessible for repair, such as on unmanned space flights. Moreover, the device preferably should be relatively small in size and simple to construct. In addition it is desirable that the restrictor be easy to insert in and remove from a fluid flow line, and for some installations the device should be arranged for varying the flow resistance to any of several preselected amounts.

SUMMARY OF THE INVENTION

The flow restrictor of this invention includes a support member on which at least one predetermined length of relatively small diameter tubing is wound. The support member has at least one terminal flange and a fluid-tight inlet and outlet extending through the flange for conducting fluid into and out of the small diameter tubing. Preferably, the inlet and outlet have standard tubing couplings on their ends. The flow rate is adjusted as desired by selecting a restrictor of a proper resistance and placing the restrictor into the fluid line.

Preferably, the restrictor tubing is capillary tubing of small enough diameter to assure all viscous flow, without being so small as to tend to clog. By winding the tubing helically on the support, relatively long lengths of the capillary tubing can be used to obtain the desired resistance without greatly increasing the overall size of the resistor. Moreover, the support protects the small tubing from damage.

In those instances where it is desired to vary the flow rate from time to time, a multiple resistance selector can be constructed in accordance with the teachings of this invention. In the multiple device, the support has a plurality of lengths of small diameter tubing wound on it, each having different flow resistance. The tubing is movable relative to a fluid inlet and outlet to position the ends of any selected length of tubing in fluid-tight communication with the inlet and outlet. In the exemplary embodiment, the support is a spool having a pair of flanges with arcuately spaced apertures through which the ends of the various lengths of capillary tubing extend. In order to select a desired length of tubing the spool is rotated to align the selected tube with the inlet and outlet. This multiple selector is particularly useful in unmanned space flights since it can be adapted for rotation of the spool on command from a radio actuated signal to change the resistance when desired.

These and other objects and advantages of this invention will be apparent from the following detailed description when read with reference to the accompanying drawings.

DESCRIPTION OF THE PREFERRED EMBODIMENT

Figure 1:
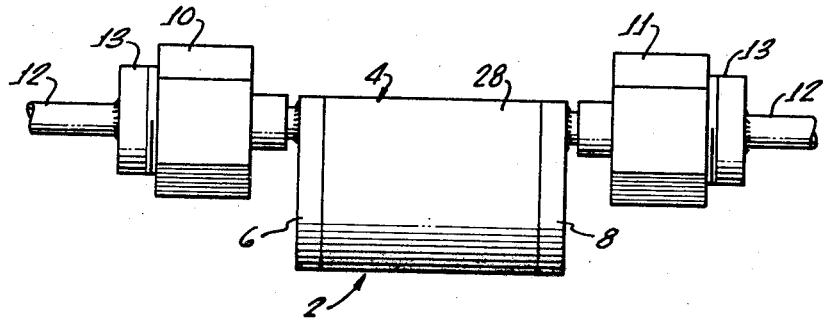
FIGURE 1 is an elevation view illustrating a restrictor constructed in accordance with this invention installed in a gas line.

Referring to FIGURE 1, the flow restrictor 2 includes a central cylindrical portion 4 and opposite circular end flanges 6 and 8. Each end flange has a coupling, e.g. a standard female coupling 10 and 11 affixed thereon for connection to a mating male coupling 13 of a gas line 12. The restrictor 2 can be readily inserted into and removed from the line 12 by use of the couplings 10 and 11.

Figure 2:
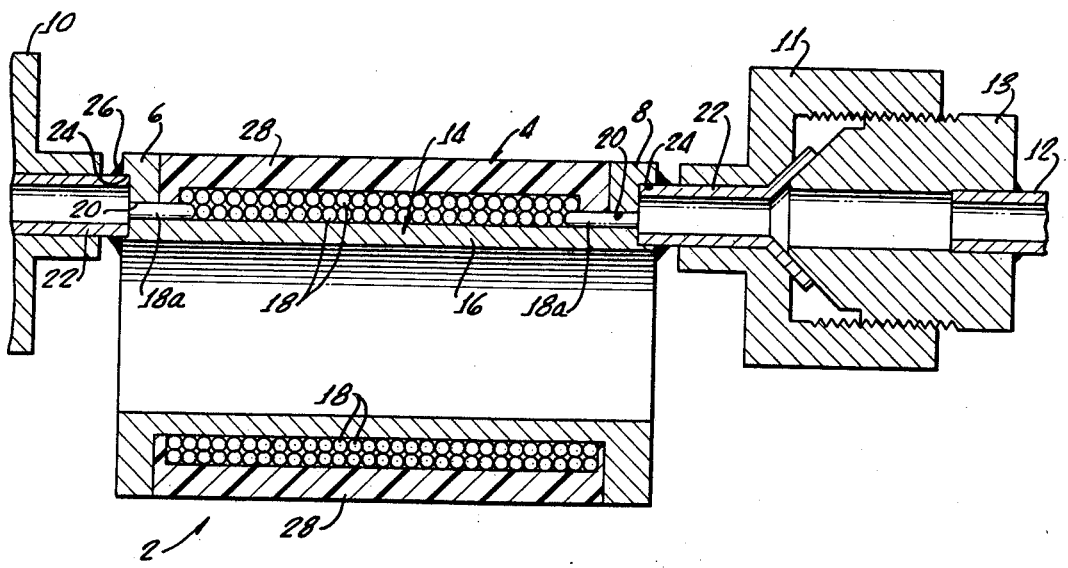
FIGURE 2 is an enlarged longitudinal section through the gas flow restrictor of FIGURE 1.

Referring now to FIGURE 2, the gas flow restrictor includes a spool 14 having an inner cylindrical body portion 16 to which the opposite end flanges 6 and 8 are connected. A predetermined length of relatively small diameter tubing 18 is helically wound on the cylindrical body portion, in two concentric layers in the exemplary embodiment. A stepped diameter bore extends through each flange and has an inner small diameter portion 20 which is approximately the size of the outside diameter of the resistor tubing 18. The ends 18a of the resistor tubing e sealingly inserted into the small diameter portion 20 the bores.

A larger diameter tubing 22 having an internal diameter approximately the size of the main conduit line 12 extends to the large diameter portion 24 of each bore. The larger tube 22 is sealingly connected to the face of the flange by solder 26. Each of the larger tubes terminates in a standard female coupling 10 and 11, for receiving mating male tubing members.

The small diameter tubing 18 utilized is preferably a very flexible stainless steel tubing having an inside diameter of about .001 to .010 inch, and is a type of tubing which is known as capillary tubing. Tubes of this size will produce all viscous flow the rate of which can be readily and accurately calculated or determined experimentally. The opening through the capillary tubing is large enough to resist clogging, but a high resistance can be obtained by helically winding long lengths, for example, up to 50 feet on the spool. A gas restrictor constructed in this manner has been utilized successfully to control the gas flow rates to a mass spectrometer at a very low rate on the order of $10^{-6}$ to $10^{-14}$ pounds of gas per second.

The gas flow through the capillary tubing is, to some extent, dependent on the temperature of the capillary tube. Therefore, the capillary tubing 18 is encased in a layer of resin 28 such as an epoxy potting compound. This resin serves as heat insulation and further protects the relatively small tubing from damage during handling.

Figure 3:
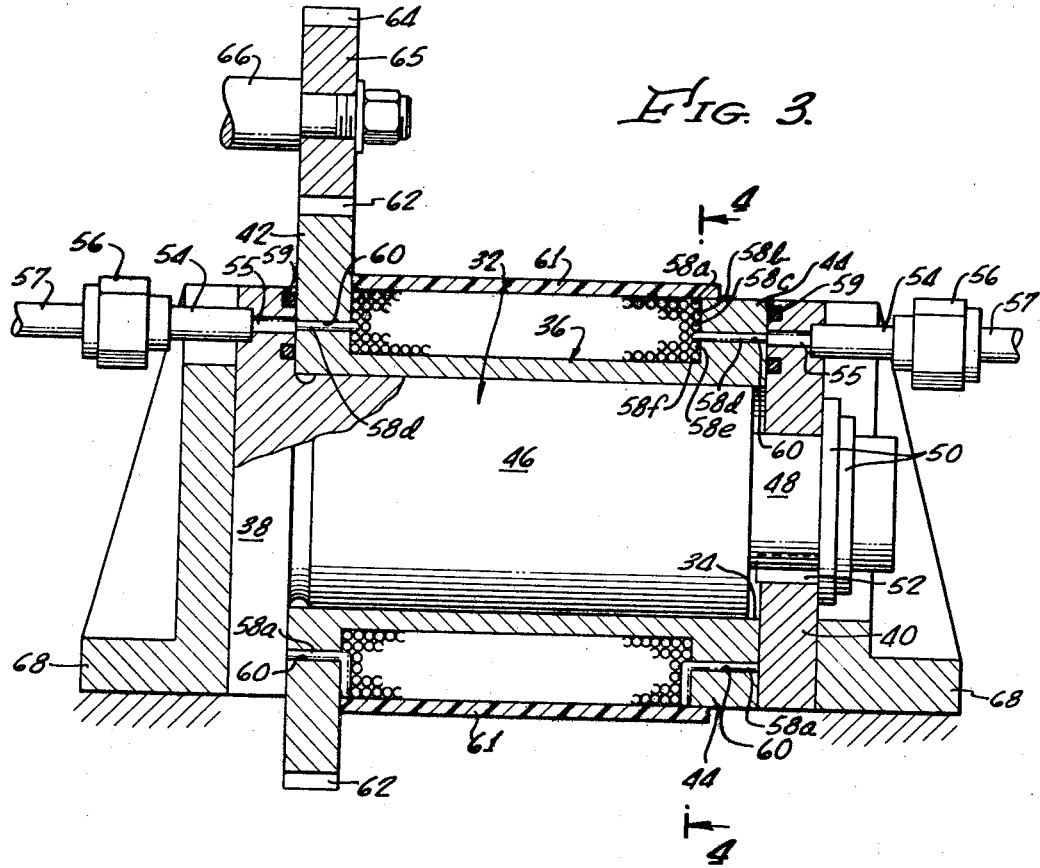
FIGURE 3 is a longitudinal section through another embodiment of the gas flow restrictor utilizing a plurality of lengths of capillary tubing any of which can be selectively put in the line.
Figure 4:
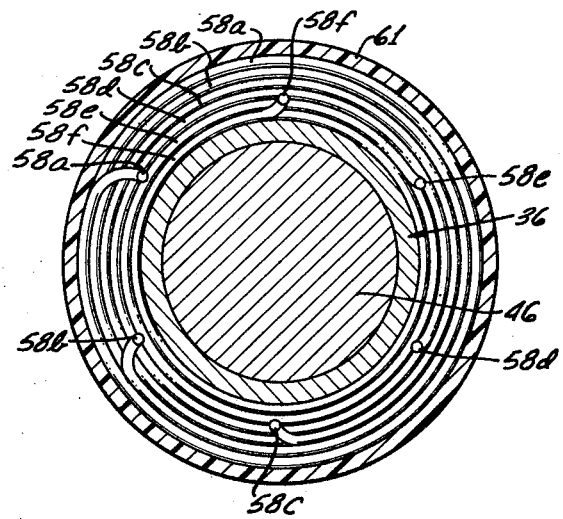
FIGURE 4 is a cross section taken generally along lines 4—4 of FIGURE 3 illustrating the arrangement of the plurality of capillary tubes.

A modified embodiment illustrated in FIGURES 3 and 4 provides a quicker and more efficient means of selecting any of a variety of flow rates and has even greater application to space utilizations since the flow rate can be changed automatically on command from an earth station. That multiple gas flow restrictor includes a core 32 extending axially through the central aperture 34 of the spool 36. The core has an inlet flange 38 at one end and an outlet flange 40 on the opposite end, each of which abuts a respective one of the spool flanges 42 and 44 in sliding face-to-face contact. The one core flange 38 is integral with the main portion 46 of the core and the opposite flange 40 is inserted on a reduced diameter core portion 48 and retained in place by retaining rings 50. The outlet flange is rotationally fixed to the core by a key 52. A piece of tubing 54 with a standard coupling 56 thereon extends into a stepped diameter bore 55 in each of the inlet and outlet flanges.

As can be seen from FIGURE 3 and FIGURE 4, a plurality of separate lengths 58a, 58b, 58c, 58d, 58e, and 58f of the capillary tubing are helically wound on the spool 36. Each of the capillary tubes 58a . . . f is of a different length or diameter so as to provide a different resistance to flow. Each of the flanges 42, 44 of the spool includes a plurality of arcuately spaced apertures 60 therethrough and each capillary tube end extends into a different one of the apertures. Each tube has one end in an aperture in one spool flange 42 and the other end in the other spool flange 44, and the tubing 58 stops short of the core flanges 38 and 40. The apertures 60 are arranged so that as the spool 36 is rotated on the core 32 the apertures will, in turn, register in communication with the bores 55 through the inlet and outlet flanges. Thus, each of the capillary tubes 58a . . . f in turn has its inlet and outlet end simultaneously aligned with the inlet and outlet tubes 54. The aligned capillary tube is in fluid-tight sealed communication with the inlet and outlet by virtue of O-ring seals 59 disposed in the inner face of each core flange around the bore 55. As in the first embodiment, the capillary tubes are encased in resin 61.

In a manually operated installation, indexing means (not shown) can be provided to precisely locate the spool 36 at each of the proper rotational positions. In the mechanized device illustrated in FIGURE 3, one flange 42 of the spool includes gear teeth 62 on its periphery which mate with teeth 64 on a drive gear 65 for rotating the spool. The drive gear is suitably connected to a power source by a shaft 66. The core 32 is fixed against rotation by brackets 68 on the opposite flanges 38 and 40 and the brackets are fastened to a suitable support.

In use, the resistor may be inserted in a gas line by use of the couplings 56. The spool 36 then is rotated by the drive gear 65 until the ends of a selected length of spirally wound capillary tubing 58a . . . f are brought into gas-tight alignment with the aperture 55 through the inlet and outlet flanges 38 and 40 of the core 32. When a different flow rate is desired, the spool 36 is rotated again until the appropriate length of capillary tubing is in position in the flow path. Thus, any one of the various capillary tubes 58a . . . f can be selectively placed in the fluid flow line 57 to vary the flow resistance without removal of the restrictor.

This multiple selector mechanism is readily adaptable to use with an instrument such as a mass spectrometer or a gas chromatograph where analysis of gas samples at different flow rates is frequently required. By coupling the drive gear 65 to a manual selector, the necessary flow resistance can quickly be placed in the line. In space applications, the drive gear can be coupled to a servo-mechanism actuated on radio command to change the flow rate resistance to the desired value.

The above specific embodiments are intended only as example of this invention, and the scope of the invention should be measured in accordance with the following claims.

What is claimed is:

1. A multiple gas flow resistance selector mechanism comprising:
   a gas inlet and a gas outlet;
   a spool mounted for rotation relative to the inlet and outlet;
   a plurality of lengths of capillary tubing having different flow resistances wound on the spool, each length of capillary tubing having its ends aligned with the inlet and outlet at one rotative position of the spool; and
   means for sealably connecting the aligned length of capillary tubing to the inlet and outlet.

2. A multiple flow resistance selector mechanism comprising:
   a support;
   a plurality of lengths of resistor tubing, each length having a given flow resistance differing from the flow resistance of the other lengths of resistor tubing mounted on the support;
   a fluid inlet member;
   a fluid outlet member; and
   means connecting the inlet and outlet members to the support for accommodating movement of the resistor tubing relative to the inlet and outlet members to position the ends of a selected length of tubing in fluid-tight communication with the inlet and outlet member.

3. A multiple flow resistance selector mechanism comprising:
   a support including a spool having a body including a pair of flanges coupled with the body at its opposite ends, each flange having means defining a plurality of arcuately spaced apertures extending therethrough;
   a plurality of lengths of resistor tubing wound around the spool body with one end of each length extending into an aperture in one flange and the other end thereof extending into one of the apertures in the other flange;
   means defining a fluid inlet member including a tubular member having a substantially greater diameter than the lengths of resistor tubing;
   means defining a fluid outlet member including a tubular member having a diameter substantially greater than the diameter of the lengths of resistor tubing; and means connecting the inlet and outlet members in fluid-tight communication to the flange of said body adapted to accommodate relative movement therebetween, whereby the ends of any selected length of tubing may be disposed in fluid-tight communication with the inlet and outlet members.

4. A multiple flow resistance selector mechanism in accordance with claim 3 wherein the inlet and outlet members further includes:

a core extending axially through the spool body for accommodating rotation of the spool on the core;

an inlet flange on one end of the core in sliding face-to-face contact with one of the spool flanges;

an outlet flange on the opposite end of the core in face-to-face contact with the other spool flange, the inlet and outlet tubes being connected to the inlet and outlet flange respectively so as to register in fluid-tight communication with the ends of any selected resistor tube as the spool is rotated relative to the core.

5. A multiple flow resistance selector mechanism in accordance with claim 4 and further comprising an O-ring disposed in each of the inlet and outlet flanges to seal around the aperture of the selected restrictor tubing.

6. A multiple flow resistance selector mechanism accordance with claim 4 and further comprising:

a bracket for fixing the core against rotation; and
power means for rotating the spool.

7. A multiple flow resistance selector mechanism accordance with claim 2 wherein the lengths of restrict tubing are encased in an epoxy resin insulation.

References Cited

UNITED STATES PATENTS

| | | | |
|---|---|---|---|
| 1,915,352 | 6/1933 | Bottoms | 165—1( |
| 2,039,066 | 4/1936 | De Weese | 165—1( |
| 2,337,862 | 12/1943 | Baer | 138—4 |
| 2,339,229 | 1/1944 | Wyllie | 165—1: |
| 2,466,676 | 4/1946 | Boling | 165—1( |
| 2,489,914 | 11/1949 | Lindgren | 138—4 |
| 2,840,096 | 6/1958 | Du Bois | 138—4 |
| 3,346,117 | 10/1967 | Page | 138—4 |

HERBERT F. ROSS, Primary Examiner

U.S. Cl. X.R.

62—204, 222; 138—46